United States Patent [19]

Harmon

[11] 4,367,569

[45] Jan. 11, 1983

[54] CAM LOCKING PIN

[75] Inventor: Samuel R. Harmon, Clinton, Iowa

[73] Assignee: Bee Line Company, Bettendorf, Iowa

[21] Appl. No.: 282,676

[22] Filed: Jul. 13, 1981

[51] Int. Cl.³ .............................................. A44B 21/00
[52] U.S. Cl. ..................................... 24/211 P; 411/340
[58] Field of Search ............ 24/211 P, 248 E, 249 R, 24/250, 263 B; 411/340, 344, 345; 292/257

[56] References Cited

U.S. PATENT DOCUMENTS

| | | | |
|---|---|---|---|
| 1,229,851 | 6/1917 | Abercrombie | 292/257 |
| 1,281,000 | 10/1918 | Hayter | 411/340 |
| 2,185,782 | 1/1940 | Brittin | 24/263 R |
| 3,673,910 | 7/1972 | Collister | 411/345 |
| 3,861,268 | 1/1975 | Jaggers | 411/340 |
| 3,909,180 | 9/1975 | Von Holdt | 425/451.9 |
| 3,926,294 | 12/1975 | Bastian | 400/463 |

FOREIGN PATENT DOCUMENTS 552100  3/1943  United Kingdom ............... 411/345

Primary Examiner—Robert P. Swiatek
Attorney, Agent, or Firm—Henderson & Sturm

[57] ABSTRACT

A cam locking pin for temporarily securing together a pair of members such as plates having confronted faces and aligned apertures. The pin is inserted through the apertures, as from below. A pawl member at the upper end of the position is pivoted ninety degrees to a position in which its long dimension lies crosswise of the pin and apertures and that dimension is greater than the diameter of the pin so that the pin cannot fall out of the apertures. A lower portion of the pin depends below the bottom plate and has a stud or lug thereon for receiving a swingable tool having cam or eccentric surfaces acting against the lower plate to draw the plates together. The cam is so shaped as to retain its locking position until released.

1 Claim, 6 Drawing Figures

U.S. Patent        Jan. 11, 1983        4,367,569
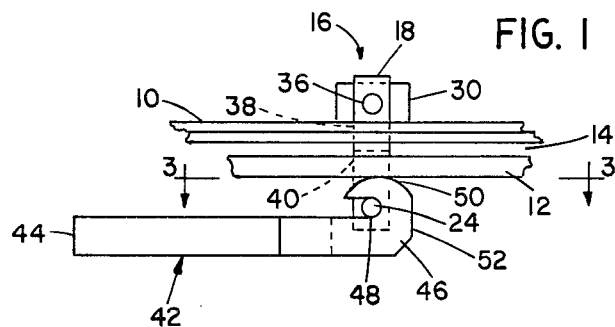
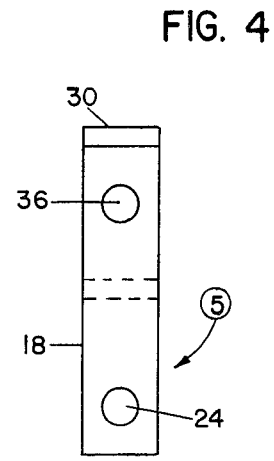
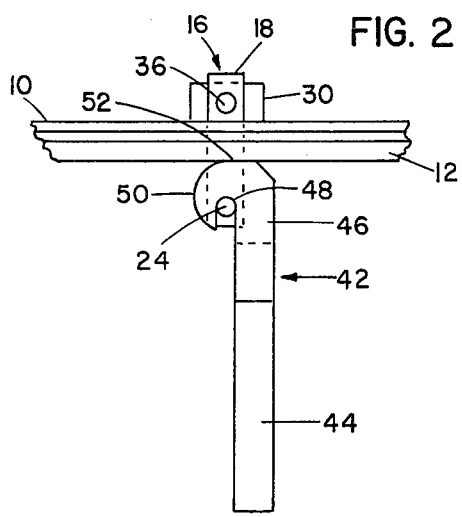
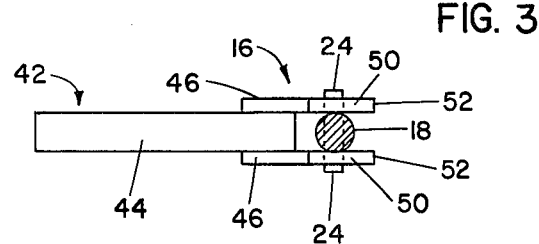
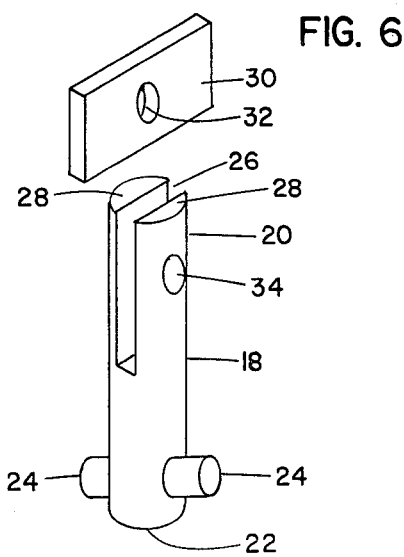

CAM LOCKING PIN

BACKGROUND OF THE INVENTION

Many devices have been provided over the recent past for locking together a pair of members for securing them in a temporarily selected position. The commonest of these, of course, is the conventional nut and bolt, the disadvantages of which are that the parts may become lost, a wrench is required to tighten the nut and considerable manual effort must be expended. Other types of devices include headed pins with some form of wedge means driven through a slot in the unheaded end of the pin. Here again the parts are separable and are subject to loss.

The present invention is directed especially to instances involving relative heavy steel structures; e.g., one including a base or bed over which a second structure may be moved, as about a pivot. In an instance in which the pivoted member lies below the base, some amount of sag will be present, and this must be eliminated when the base and bed are locked together. It often occurs that one or the other of the members will include a channel member in the area in which locking must take place, making it difficult if not impossible to insert a headed pin from above and likewise rendering it disadvantageous to insert the pin from below while attempting to insert a wedge or the like from above.

According to the present invention, these and other problems are eliminated by the provision of a pin having at its upper end a recess, preferably in the form of a slot that opens axially as well as diametrically of the pin. A pawl member is carried in the slot on a pin crosswise of the slot and the pawl is so shaped as to have a long dimension greater than the diameter of the pin and a short dimension at least not substantially greater than the pin diameter. The slot has such depth that, when the pawl is positioned with its long dimension in prolongation of the pin, the pin may be inserted through alined apertures from below, after which the pawl is turned ninety degrees so that the pawl spans the upper aperture and prevents the pin from falling out. The lower end of the pin has lug means there that will be spaced below the lower member. A tool is provided for wedging action between the lug means and the lower member for forcing the lower member tightly upwardly into face-to-face contact with the upper member, thus securing the two members rigidly together. The tool is in the form of a lever having a bifurcated end providing interior hooks for engagement with the diametrically projecting lug means and exterior cam surfaces for creating the wedging action.

DESCRIPTION OF THE DRAWINGS

FIG. 1 is an elevation showing the parts in position before actuation of the locking device.

FIG. 2 is a similar view and shows the result of the locking action.

FIG. 3 is a section on the line 3—3 of FIG. 1.

FIG. 4 is an enlarged view of the pin and pawl member with the pawl member turned ninety degrees from its FIG. 1 position.

FIG. 5 is an end view as seen in the direction of the arrow leading from the encircled numeral 5 in FIG. 4.

FIG. 6 is an "exploded" perspective of the pin and pawl member.

DETAILED DESCRIPTION OF THE INVENTION

In FIG. 1, the numeral 10 designates a base or bed made up for example of steel plates, and below it is a lower plate-like member 12. As noted, there is a gap or space 14 between the confronting surfaces of the members. The cam locking pin is designated in its entirety at 16 and it is the function of this device to draw the members tightly together as in FIG. 2.

The locking device includes a pin-like element 18 of cylindrical cross section having upper and lower ends 20 and 22, respectively (FIG. 6). The length of the pin is such that its upper and lower ends will extend respectively above and below the upper and lower members. Here, as elsewhere in this description, the use of such expressions as "upper", "lower", etc., is resorted to in the interests of clarity and convenience. Obviously the parts may be otherwise oriented. The lower projecting end of the pin has a pair of diametrically oppositely projecting lug means 24, preferably a hardened steel pin inserted via a force-fit through an appropriate hole (not shown as such) in the similarly hardened steel pin 18. The upwardly projecting top end of the pin 18 has a recess or pocket therein in the form here of a slot 26 opening axially as well as diametrically of the pin to bifurcate the end 20 and thus provide a pair of leg means 28.

A pawl member 30 has a central aperture 32 which lines up with cross holes 34 in the pin 18 when the pawl is received in the slot. A suitable pivot pin 36 (FIGS. 1 and 2) is passed through the aligned holes to mount the pawl on a pivot axis crosswise of the slot and diametrically of the pin 18. As will be noted, the long dimension of the pawl is considerable greater than the diameter of the pin 18 and its short dimension is at least not substantially greater than the pin diameter. The depth of the slot 20 below the pivot pin 36 is such as to receive one end of the pawl member when that member is turned to the position of FIG. 4, which is in effect a prolongation of the pin 18. This enables upward insertion of the upper end of the pin 18 and pawl through holes 38 and 40 in the upper and lower members 10 and 12 respectively. After the pin is so inserted, the pawl member is rotated ninety degrees to the position shown in FIGS. 1, 2 and 6. It will also be noted that the combined thickness of the pawl and leg means 28 is about the same as the diameter of the pin 18.

At this stage, the lower end of the pin projects below the lower member 12 and the diametrically oppositely projecting lug means are spaced below that member. The lug means can have this amount of projection because of the ability of the pin 18 to be inserted pawl end first through the member apertures 38 and 40. The insertion could be reversed of course, the present illustration being based on a situation where surrounding structure (not shown) would prevent insertion of the pin from above. The means for drawing the members 10 and 12 tightly together here includes a tool 42 having a handle 44 to which a pair of hook-like plate elements 46 are rigidly affixed (as by welding). These elements give the handle or tool a bifurcated end and each furcation or plate element has an interior hook 48 for hooking over one of the lug means 24, starting with the position of FIG. 1. Each furcation has an exterior cam or eccentric 50 formed on an arc of increasing radius relative to the axis of the lug means. Thus when the tool is rotated counter-clockwise from the position of FIG. 1 to that of FIG. 2, the cams act as wedge means against the under face of the lower member 12 and, since the cross-wise pawl engages the top of the upper member 10, the two members are drawn tightly together. Each cam 50 leads to a flat 52 which functions to hold the tool in its locked position (FIG. 2) until manually released.

Among the features of the invention are these: it is easy and positive to operate; the pivoted pawl prevents loss of the pawl; the combined pin and pawl are large enough to be easily handled and not likely to become misplaced; the tool is likewise easy to handle and not likely to become misplaced; the several parts of the structure are simple and quite easy to manufacture. Features other than those enumerated will readily occur to those versed in the art, as will many modifications in the preferred embodiment of the invention disclosed herein.

I claim:

1. A clamping device, comprising: a pin-like element of cylindrical section having first and second ends, said first end including a pair of lugs projecting radially from the opposite sides of the element and said second end including a diametrical slot therein opening axially of the element and providing a pair of diametrically spaced apart legs rigid with the element and lying within the cylindrical surface of the element, a pawl received in the slot and having a long dimension greater than the diameter of the element, a short dimension at least not substantially exceeding the element diameter and a thickness commensurate with the transverse dimension of the slot so that the combined thickness of the legs and pawl does not exceed the diameter of the element, pivot means crosswise of the legs and recess and mounting the pawl on the legs for selective angular positioning about said pivot means between a first position in which the pawl lies with its long dimension crosswise of the element and projects diametrically beyond both sides of the element and a second position 90° from the first position in which the long dimension of the pawl extends lengthwise of the element, said recess being of such depth as to accommodate at least part of the pawl in its second position, and a force-applying tool having a pair of hooks spaced apart to straddle the element and removably engageable respectively with the lugs for exerting a force axially of the element and between the lugs and the pawl member in its first position, each of said hooks including a wedging portion of increasing dimension in the direction of the pawl, and said tool further including handle means for manual rocking of the tool about the lugs.

* * * * *